No. 828,427. PATENTED AUG. 14, 1906.
W. J. SELLECK.
COALING STATION.
APPLICATION FILED APR. 23, 1902.
3 SHEETS—SHEET 2.
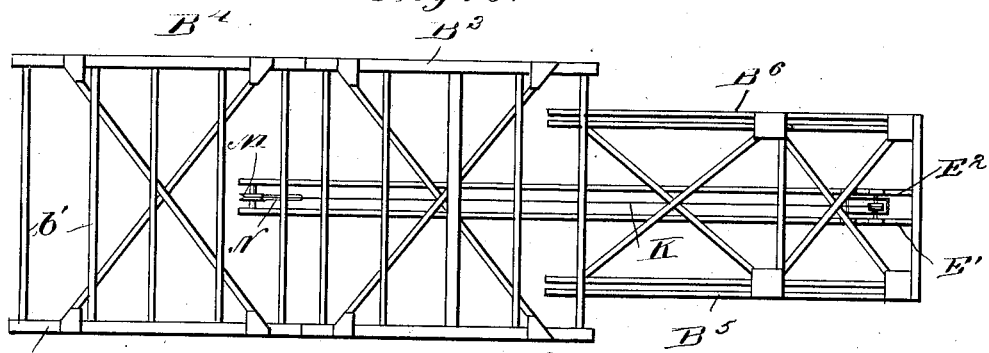
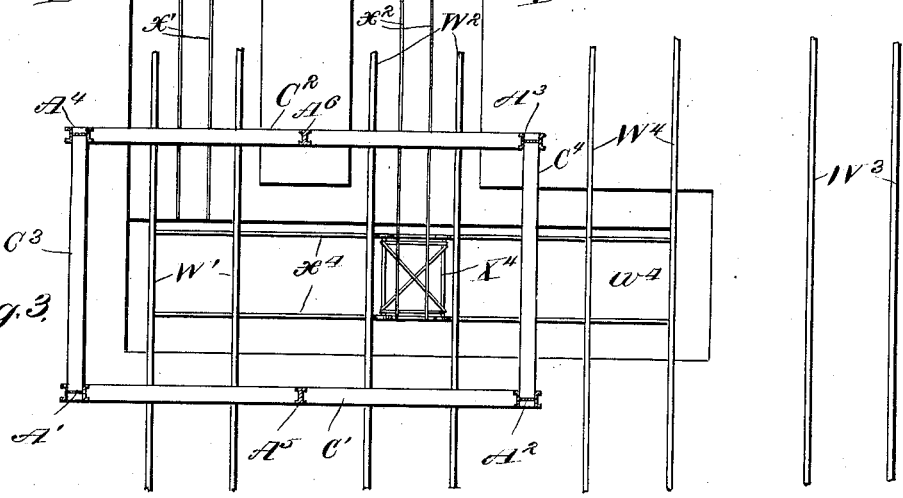
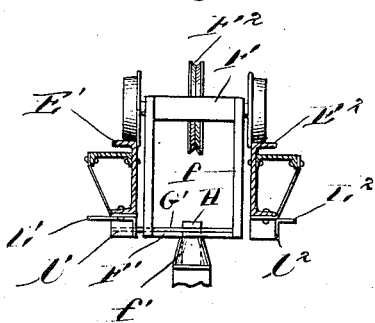
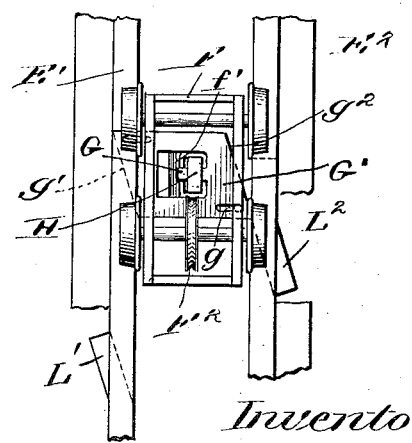
Witnesses:
H. S. Gaither
Geo. L. Wilkinson
Inventor:
William J. Selleck
by Walter H. Chamberlin
Attorney.

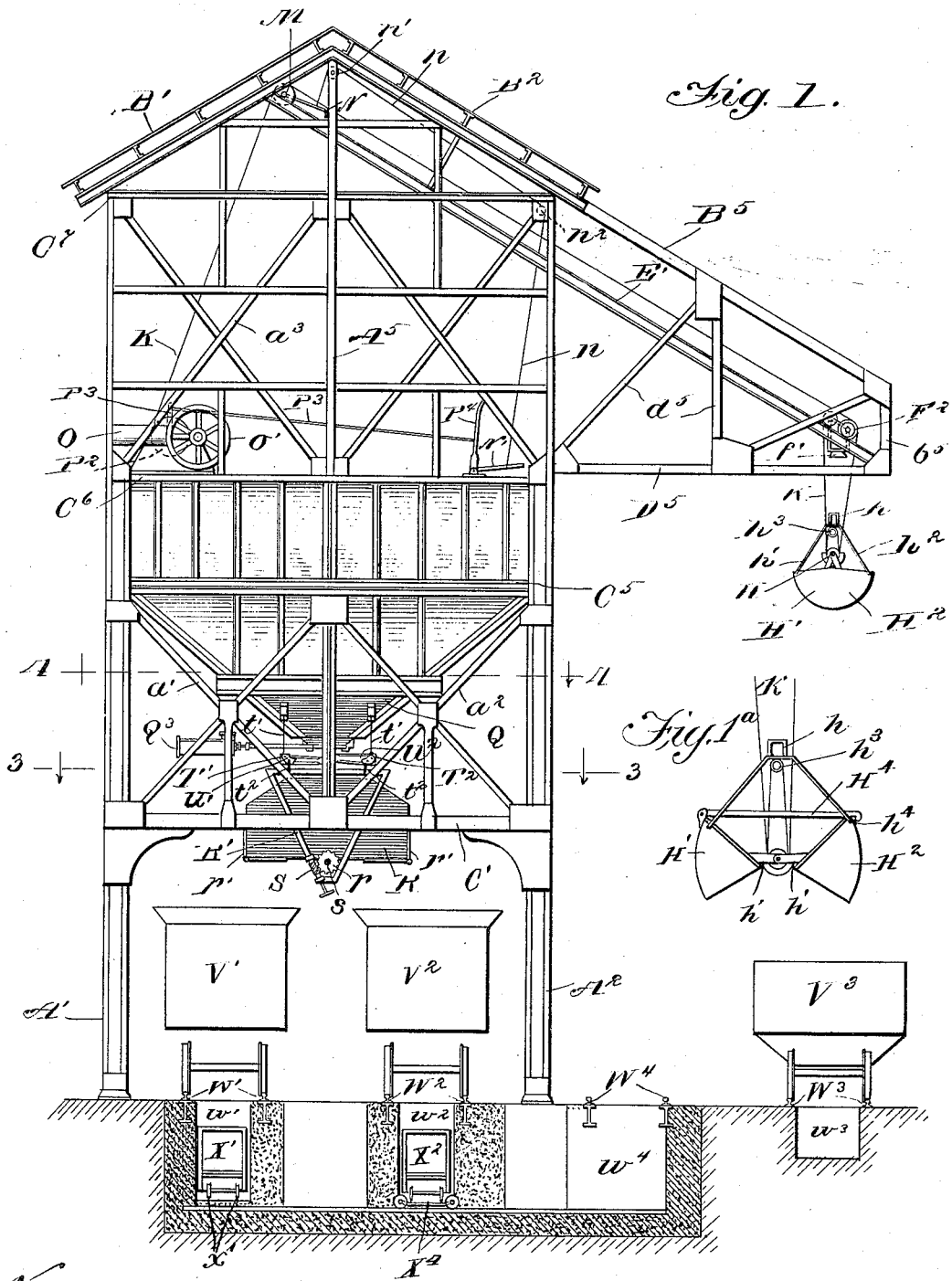

No. 828,427. PATENTED AUG. 14, 1906.
W. J. SELLECK.
COALING STATION.
APPLICATION FILED APR. 23, 1902.

3 SHEETS—SHEET 3.

Witnesses:
H. L. Gaither
Geo. L. Wilkinson

Inventor:
William J. Selleck
by Walter H. Chamberlain
Attorney

UNITED STATES PATENT OFFICE.

WILLIAM J. SELLECK, OF RIVERSIDE, CONNECTICUT.

COALING-STATION.

No. 828,427.  Specification of Letters Patent.  Patented Aug. 14, 1906.

Application filed April 23, 1902. Serial No. 104,416.

*To all whom it may concern:*

Be it known that I, WILLIAM J. SELLECK, a citizen of the United States, residing at Riverside, county of Fairfield, State of Connecticut, have invented a certain new and useful Improvement in Coaling-Stations; and I declare the following to be a full, clear, and exact description of the invention, such as will enable others skilled in the art to which it pertains to make and use the same, reference being had to the accompanying drawings, which form a part of this specification.

My invention relates generally to apparatus for unloading coal or other material, and more particularly to apparatus for transferring coal from cars to the tenders of locomotives.

It is customary to provide railroads at various points with coaling-stations where coal is supplied to the tenders of locomotives. It is desirable by a single operation to transfer the coal from the cars to the locomotive-tenders, and thereby avoid the necessity of twice handling the coal. It is also desirable to weigh the coal loaded upon the tender of each locomotive.

The object of my invention is to provide an apparatus for transferring coal from a car to the tender of a locomotive and for weighing the coal during the operation of removing it from the car and loading it upon the tender.

A further object of my invention is to provide a locomotive-coaling tower at which the coal may be weighed and loaded upon the tenders of locomotives and at which also the ashes may be removed from the fire-boxes.

A further object of my invention is to provide a locomotive-coaling tower which will be comparatively simple in construction and which will facilitate the handling and weighing of coal.

My invention, generally described, comprises a tower beneath which tracks extend for the locomotive to run upon, a hopper supported by the tower above the tracks, a weighing-box to receive the coal from the hopper and transfer the same to the tender of a locomotive, and means for unloading coal from a coal-car and depositing it in the hopper.

My invention will be more fully described hereinafter with reference to the accompanying drawings, in which the same is illustrated as embodied in a convenient and practical form, and in which—

Figure 5:
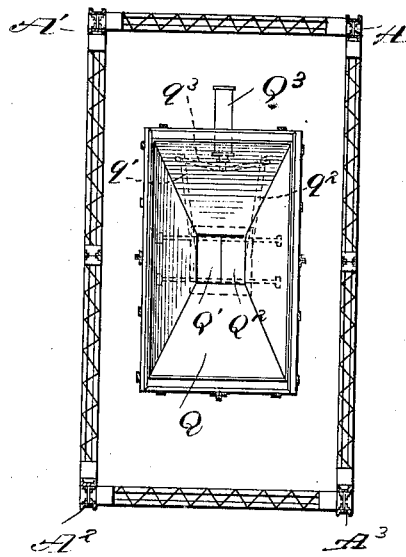
Figure 4:
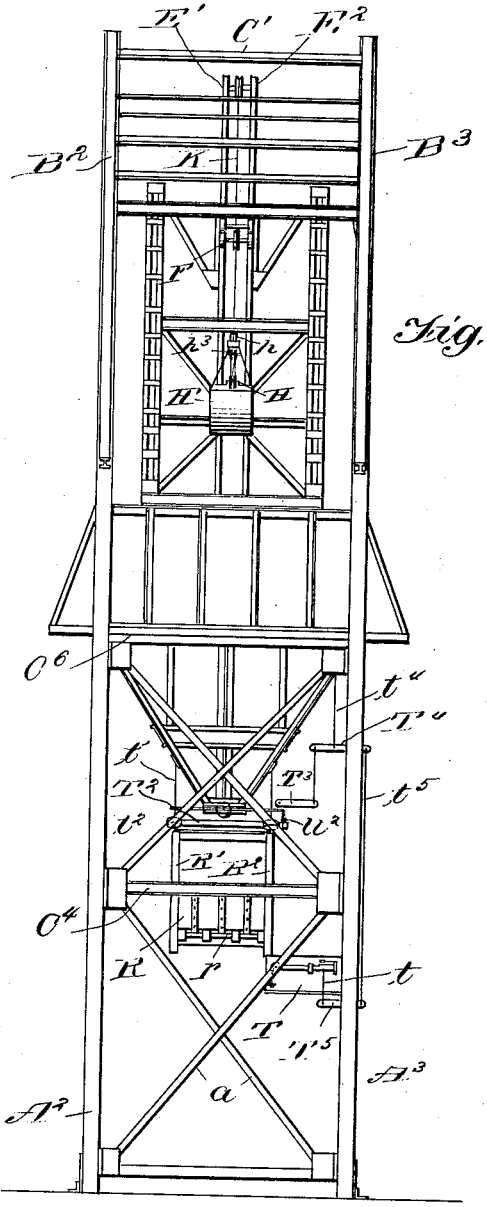
Figure 6:
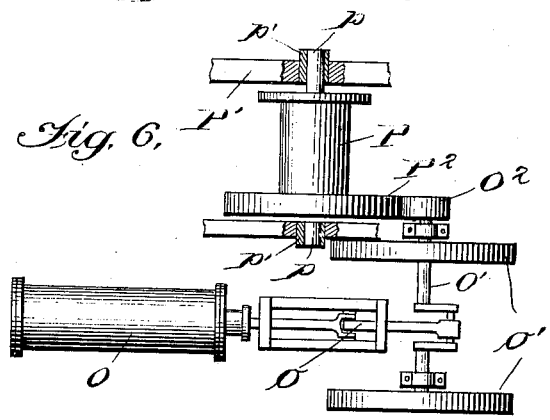

Figure 1 is an elevational view of my improvement; Fig. 1$^a$, a detail view of the bucket retained in its open position; Fig. 2, a plan view of the top structure thereof; Fig. 3, a sectional plan view taken on line 3 3, Fig. 1, with parts omitted to better show the tunnels beneath the tracks; Fig. 4, an elevational view looking from the right in Fig. 1; Fig. 5, a sectional view on line 4 4, Fig. 1, looking downwardly into the hopper; Fig. 6, an enlarged detail view of the engine for operating the hoisting mechanism; Fig. 7, an enlarged detail view showing the manner of supporting the bucket beneath the trolley, and Fig. 8 a plan view looking downwardly with respect to Fig. 7.

Similar reference characters are used to indicate similar parts in the several figures of the drawings.

Reference-letters $A'$, $A^2$, $A^3$, and $A^4$ indicate vertical posts, preferably constructed of channel steel beams. Horizontal beams $C'$, $C^2$, $C^3$, and $C^4$ connect the posts at a point above their bases sufficient to permit a locomotive to pass thereunder. At a higher level than the beams $C'$, &c., are arranged horizontal beams $C^5$, which also unite the posts, and at a still higher level are other horizontal beams $C^6$. The upper ends of the posts are connected by horizontal beams $C^7$. Suitable trusses $a'$ and $a^2$ are interposed between the posts and the horizontal beams to give the requisite strength to the structure. Vertical posts $A^5$ and $A^6$ extend upwardly at points intermediate of the posts $A'$ and $A^2$ and $A^3$ and $A^4$, respectively, and are supported at their lower ends upon the horizontal beams $C'$ and $C^2$. The upper ends of the posts $A^5$ and $A^6$ extend above the horizontal beams $C^7$, as shown in Fig. 1. The upper ends of the posts $A'$ and $A^4$ are connected with the upper ends of the posts $A^5$ and $A^6$ by inclined beams $B'$ and $B^4$, respectively. Similar inclined beams $B^2$ and $B^3$ connect the upper ends of the posts $A^2$ and $A^3$ with the tops of the posts $A^5$ and $A^6$, respectively.

Beams $B^5$ and $B^6$ project beyond the plane of the posts $A^2$ and $A^3$ at one side of the structure. The outer ends of the beams $B^5$ and $B^6$ are supported by overhanging beams $D^5$ and $D^6$, which project horizontally from the posts $A^2$ and $A^3$, respectively, at points substantially opposite the horizontal beams $C^6$. Short vertical posts $b^5$ and $b^6$ are interposed between the corresponding ends of the beams $B^5$ and $D^5$ and $B^6$ and $D^6$. Suitable struts $d^5$ are interposed between the beams $B^5$ and $D^5$ and B⁶ and D⁶ to give the requisite strength by forming a cantaliver.

Supported parallel with and at a slightly lower plane than the beams B⁵ and B⁶ are channel-beams E' and E², which serve as tracks upon which a trolley F is supported. The tracks preferably extend in an incline direction from the outer ends of the beams D⁵ and D⁶ to a point slightly beyond the central vertical posts A⁵ and A⁶.

The trolley F is provided with wheels which engage the tracks E' and E² and is also provided with a horizontal base F', which depends from the trolley by means of hangers $f$. The base F' is provided with a funnel or bell shaped downwardly-projecting portion $f'$. Upon the upper surface of the base F' is movably supported a plate G'. The plate G' is so supported upon the base F' as to be capable of a horizontal sliding movement transversely with respect to the tracks E' and E². Any suitable connection between the plate G' and base F' may be provided—such, for instance, as slots $g$, formed in the plate, through which extend pins secured to the upper surface of the base F'. The opposite edges $g'$ and $g^2$ of the plate G' are parallel with respect to the planes of the tracks. A tongue G is formed within the plate G' by cutting away a portion of the plate, as clearly shown in Fig. 8.

Supported beneath the tracks E' and E² are obstructions L' and L², the former of which is located farther up the incline of the tracks than the latter. The obstructions L' and L² are provided with downwardly-extending flanges $l'$ and $l^2$, respectively, which are parallel with each other and are inclined with respect to the planes of the tracks, as clearly shown in Figs. 7 and 8. The inclination of the flanges $l'$ and $l^2$ corresponds with the inclination of the edges $g'$ and $g^2$ of the plate G'.

A bucket, preferably of the well-known clam-shell type, composed of hinge portions H' and H², depends from the truck F. The outer top edges of the portions H' and H² of the bucket are pivotally connected to arms $h'$ and $h^2$, respectively, which at their upper ends are pivotally secured to a link $h$. A latch-bar H⁴ is pivotally secured at one end to the upper edge of the portion H' of the bucket and is adapted to engage a lug $h^4$, projecting outwardly from the upper edge of the other portion H² of the bucket. The latch-bar serves to retain the bucket in its open position, as shown in Fig. 1ª.

A pulley M is journaled at the upper ends of and between the tracks E' and E². A gravity-hook N is pivotally supported, preferably at the same point where the pulley M is located. A flexible connection $n$ is secured to the hook N, thence passes over a sheave $n'$, thence over a second sheave $n^2$, thence to a lever N', which is pivotally mounted upon a platform located above the horizontal beam C⁶.

An engine O of any suitable construction is supported upon the platform above the beams C⁶ and is connected to a crank-shaft O' by a connecting-rod $o$. The crank-shaft is provided with fly-wheels $o'$ and at one end thereof with a friction-wheel O². A drum P, having a large friction-wheel P² thereon, is journaled upon suitable supports P', mounted above the beams C⁶. Spindles $p\ p$, concentric with the drum, are journaled in eccentric bearings $p'\ p'$, which in turn are rotatably mounted in circular apertures formed in the supports P'. Levers P³ are rigidly connected with the eccentric bearings $p'\ p'$ and extend upwardly therefrom. Connections $p^3$ are interposed between the levers P³ and a lever P⁴, which may conveniently be journaled at the same point where the lever N' is located.

A cable K is secured at one end to the drum P, thence extends over the guide-pulley M, thence over the guide-pulley F², supported upon the trolley F, thence around the guide-pulley journaled at the point H where the two parts of the bucket are pivotally united, thence around a sheave $h^3$, supported below the link $h$, thence around a guide-pulley at the pivotal point of connection between the parts of the bucket, thence to the trolley, where it is fixed. When tension is applied to the cable K, the pivotal point H and a sheave $h^3$ are drawn together, which, through the arms $h'$ and $h^2$, forces the two parts of the bucket together, the bucket being retained closed by the weight of the coal, as is customary in the well-known type of clam-shell bucket. It is of course necessary to disengage the latch-bar H⁴ from the lug $h^4$ before tension is applied to the cable in order that the bucket may be closed.

A hopper Q is supported between the posts A', A², A³, and A⁴ in any suitable manner. Horizontally-sliding doors Q' and Q² (see particularly Fig. 5) control the opening at the bottom of the hopper. A cylinder Q³ or any other suitable means is operatively connected with the sliding doors Q' and Q² in any desired manner—as, for instance, by means of toggle-links $q^3$, connected to the piston-rod and also to the ends of levers $q'$ and $q^2$, the other ends of which levers are connected with the sliding doors.

Located below the hopper Q is a receptacle R, provided with downwardly-swinging doors $r'$ and $r^2$ at its opposite sides. The doors $r'$ and $r^2$ are retained closed by any suitable means—such, for instance, as the pivoted catches $r^3$. (Shown in Fig. 1 of the drawings.) The box R is open at its top and is rigidly secured to a shaft $r$, extending beneath the bottom thereof. The opposite ends of the shaft $r$ are journaled in frames R' and R², which are preferably of triangular shape. Two parallel shafts T' and T² extend immediately above the horizontal portions of the triangular frames R' and R². These shafts T' and T² are supported at their opposite ends by links $t'$ $t'$, the upper ends of which are secured to the hopper Q. Links $t^2$ $t^2$ are interposed between the opposite ends of the shafts T' and T² and the triangular frames R' and R². The links $t^2$ $t^2$ are connected to the shafts T' and T² at points within or nearer together than links $t'$ $t'$. Arms $u'$ and $u^2$ are connected to the shafts T' and T² at approximately opposite points and extending toward each other. The free ends of the arms $u'$ and $u^2$ are both united to a lever T³ by a flexible connection. The lever T³ is fulcrumed at one end and at its other end is connected to a link or flexible connection $t^3$. The opposite end of the flexible connection $t^3$ is connected to one end of a lever T⁴, the opposite end of such lever being united by a flexible connection $t^5$ to one end of a lever T⁵. The other end of the lever T⁵ is united, by means of a flexible connection $t$, to a scale T of any suitable construction, preferably of a recording-beam type. The levers T⁴ and T⁵ are fulcrumed between their opposite ends, the former by means of a depending connection $t^4$.

One end of the shaft $r$, to which the receptacle R is rigidly secured, is provided with a worm-wheel $s$, which meshes with a worm $s'$, fixed upon a short rotary shaft S. The shaft S is provided with means for conveniently rotating the same and is journaled in brackets secured to the triangular frame R'.

Tracks W' and W² extend between the posts A' and A⁴ and A² and A³, respectively. In the spaces between the rails of the tracks W' and W² are formed subpassages $w'$ and $w^2$. At the bottoms of the passages $w'$ and $w^2$ are located tracks $x'$ and $x^2$, respectively. A subway $w^4$ extends transversely with respect to the subways $w'$ and $w^2$ and is provided with rails $x^4$ at a lower level than the rails $x'$ and $x^2$ in the subways $w'$ and $w^2$. A truck X⁴ is supported upon the rails $x^4$ and is provided with short sections of rails on the upper surface thereof, which may form continuations of the rails $x'$ and $x^2$, when the truck is located in alinement with either of the subways $w'$ or $w^2$.

Rails W⁴ are located outside of and parallel with the posts A² and A³, and also above the outer end of the transverse subway $w^4$.

Rails W³ are located parallel with the posts A² and A³ and immediately below the outer end of the tracks E' and E², upon which the trolley F is supported. A subpassage $w^3$ is preferably formed between the rails W³.

The operation of my invention is as follows: Locomotives run upon the tracks W' and W² to points between the posts of the tower, so that their tenders V' and V² occupy positions immediately below the opposite sides of the receptacle R. The ashes from the fire-boxes of the locomotives may be thrown into small cars X' and X², which are supported upon the tracks $x'$ and $x^2$ in the subpassage-ways $w'$ and $w^2$. When either of the cars X' or X² is filled with ashes, the truck X⁴ is run to a position in alinement with the corresponding subpassage and the car X' or X², as the case may be, is run upon the truck. The truck is then drawn through the transverse subpassage $w^4$ to a point outside of the tower, where the car may be emptied of the ashes. A coal-car V³, of any suitable construction, is located vertically beneath the tracks E' and E² on either of the pairs of rails W³ or W⁴. The bucket is then lowered into engagement with the coal in the car by disconnecting the drum P from its engagement with the engine O. The lever P⁴ is then operated so as to swing the levers P³ through the interposed connection $p^3$, thereby rotating the eccentric journal-boxes $p'$ $p'$ within the supports P'. The rotation of the eccentric journal-boxes moves the drum P toward the shaft O' and brings the friction-wheel P² into contact with the friction-wheel O². The operation of the engine O consequently rotates the drum P and winds thereon the cable K. The winding up of the cable closes the parts H' and H² of the bucket in a well-known manner and fills the same with coal. After the bucket has been closed the further winding up of the cable draws the bucket up into engagement with the trolley F. The link $h$ then extends through the bell-shaped projection $f'$ a slight distance above the base F' of the trolley and in alinement with the tongue G on the sliding plate G'. The further winding up of the cable after the bucket has been drawn into engagement with the trolley causes the trolley to move upwardly along the tracks E' and E². When the trolley reaches a point opposite the obstruction L², the engagement of the flange $l^2$ thereon forces the plate G' transversely and causes the tongue G to pass through the staple $h$, thereby locking the bucket securely to the trolley. The trolley continues upwardly until it reaches a point adjacent to the guide-pulley M, when the drum is disconnected from the engine by operating the lever P⁴. The trolley is held in the position to which it has been drawn by reason of the hook N engaging the trolley. When the drum is disconnected from the engine O, the bucket is opened, owing to the discontinuance of the tension on the cable, which holds the two parts thereof closed. The coal consequently falls into the hopper Q. The two halves of the bucket are retained apart, as shown in Fig. 1ª, by any suitable means—such, for instance, as the latch H⁴, which automatically engages the lug $h^4$ when the bucket opens upon the discontinuance of the tension of the cable. After the bucket has been emptied the lever N' is depressed, which through the cable $n$ lifts the hook N, which permits the trolley to run by gravity down the inclined tracks. The trolley passes the obstruction L², but when it reaches the obstruction L' the flange l' thereon engages the inclined edge g' of the plate G and forces the same transversely with respect to the base F' of the trolley, and thereby removes the tongue G from within the link h. When the trolley reaches the lower end of the tracks, the bucket descends to a position upon the coal in the coal-car V³, when the lever P⁴ is again operated to connect the drum P with the engine O and repeat the operation above described. Previous to connecting the drum P with the engine O the latch H⁴ is disengaged from the lug h⁴ by an attendant, so as to permit the bucket to be closed by the tension of the cable. The coal is allowed to fall out of the hopper Q into the receptacle R by opening and closing the sliding doors Q' and Q². The opening and closing of the doors is effected by the admission and exhaust of pressure to the opposite ends of the cylinder Q³. When the receptacle R has been filled, the doors Q' and Q² are closed. The weight of the coal in the box R is indicated upon the scale T, owing to the fact that the box is supported upon the shaft r, which in turn is supported within the triangular frames R' and R², and they in turn are connected to the scale through the shafts T' and T², the arms u' and u², and the several levers and flexible connections. (Clearly shown in Fig. 4.) After the box R has been weighed the shaft r is rotated, thereby oscillating the box in the direction desired according as the tender V' or V² is to be loaded. The doors r' and r² are adapted to swing downwardly, and thereby form a continuation of the bottom of the box, so as to insure the coal passing into the tender desired. If the coal-car V³ is of the hopper-bottom type and it is therefore impossible for the bucket to remove all of the coal therefrom, the car may be dumped and the coal then removed by the bucket from the space w³ between the rails W³.

From the foregoing description of the construction and operation of my invention it will be observed that I have devised a coaling-station for locomotives at which the coal may be transferred from a coal-car to the tender of a locomotive and at which also the ashes may be conveniently removed from the fire-box of the locomotive. It will also be observed that in my invention the coal prior to being loaded upon the tender is accurately weighed without the necessity of a handling thereof additional to that required in transferring the same from the coal-car to the tender.

While I have described more or less precisely the details of construction, I do not wish to be understood as limiting myself thereto, as I contemplate changes in form, the proportion of parts, and the substitution of equivalents as circumstances may suggest or render expedient without departing from the spirit of my invention.

Having now fully described my invention, what I claim as new, and desire to secure by Letters Patent, is—

1. In an apparatus of the character described, the combination with an inclined track, of a trolley supported on said track, a bucket depending from said trolley, a cable operatively connected to said bucket for opening and closing the same, said cable also engaging the trolley to move the same along the inclined track, a coupling device for connecting said bucket directly to said trolley, means fixed upon said inclined track for automatically actuating said coupling device to lock the bucket to the trolley as the latter travels up the track and to automatically unlock the bucket from the trolley as the latter travels down the track, and means for retaining the trolley in its elevated position upon the track whereby the propelling-cable may be slackened to permit the bucket to open.

2. In an apparatus of the character described, the combination with an inclined track, of a trolley supported on said track, a cable passing over a guide on said trolley, a bucket supported beneath said trolley by said cable and adapted to be opened and closed thereby, a coupling device for connecting said bucket directly to said trolley, means for automatically actuating said device as the trolley travels along the track, and means for retaining the trolley in its elevated position, thereby permitting the tension of the cable to be discontinued to open the bucket.

3. In an apparatus of the character described, the combination with an inclined track, of a trolley supported on said track, a clam-shell bucket depending from said trolley, a cable connected at one end to a motor, a guide at the upper end of said track over which the cable passes, a guide on said trolley engaged by said cable, a pivotal connection between the two halves of said bucket around which said cable passes, said cable being secured to said trolley, whereby a pull exerted on said cable closes the bucket, elevates the same into engagement with the trolley, and draws the trolley up the inclined track.

4. In an apparatus of the character described, the combination with an inclined track, of a trolley supported on said track, a clam-shell bucket depending from said trolley, a cable connected at one end to a motor and passing over a guide at the upper end of said track thence over a guide on said trolley thence around the pivotal connection between the two halves of said bucket, and thence to the trolley where it is secured, a device for connecting said bucket directly to said trolley, means for automatically actuating said device as the trolley travels along the track, and means for retaining the trolley against movement down the track whereby the propelling-cable may be slackened to permit the bucket to open.

5. In an apparatus of the character described, the combination with an inclined track, a trolley supported on said track, a clam-shell bucket depending from said trolley, a cable connected at one end to a motor and passing over a guide at the upper end of said track, thence over a guide on said trolley thence around the pivotal connection between the two halves of said bucket, and thence to the trolley where it is secured, a coupling device located on said trolley for engaging and disengaging the bucket, obstructions fixed upon said track for automatically actuating said coupling to lock the bucket to the trolley when the latter travels up the track and to automatically unlock the bucket from the trolley as the latter travels down the track, and means located at a predetermined point on said track for engaging said trolley and preventing the same from traveling down the track when the tension of the cable is discontinued to permit the bucket to open.

6. In a coaling-tower for locomotives, the combination with a hopper for receiving coal, of mechanism for conveying the coal to a point in the tower above the hopper and for depositing the coal in the hopper, frames suspended by and located beneath said hopper, a scale having operative connections interposed between said hopper and frames, a shaft rotatably supported by said frames, a receptacle fixed upon said shaft for receiving the coal from the hopper, and means for rotating said shaft and thereby oscillating said receptacle to dump the coal therefrom.

7. In a coaling-tower for locomotives, the combination with a hopper for receiving coal, of mechanism for conveying the coal to a point in the tower above the hopper and for depositing the coal in the hopper, a receptacle pivotally supported beneath the hopper for receiving the coal therefrom, a frame upon which the receptacle is supported, a scale operatively connected with said frame, a pair of tracks extending through the tower beneath said receptacle, and means for oscillating the receptacle to dump the material into the tender of a locomotive on either of said tracks.

In testimony whereof I sign this specification in the presence of two witnesses.

WILLIAM J. SELLECK.

Witnesses:
  GEO. L. WILKINSON,
  CLARA C. CUNNINGHAM.